(12) United States Patent
Sakata et al.

(10) Patent No.: US 12,518,736 B2
(45) Date of Patent: Jan. 6, 2026

(54) NON-TRANSITORY COMPUTER-READABLE MEDIUM AND VOICE GENERATING SYSTEM

(71) Applicant: SQUARE ENIX CO., LTD., Tokyo (JP)

(72) Inventors: Shinpei Sakata, Tokyo (JP); Yusuke Mori, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 183 days.

(21) Appl. No.: 18/502,961

(22) Filed: Nov. 6, 2023

(65) Prior Publication Data
US 2024/0153482 A1    May 9, 2024

(51) Int. Cl.
| | | |
|---|---|---|
| *G10L 13/02* | (2013.01) | |
| *G06F 40/263* | (2020.01) | |
| *G06F 40/284* | (2020.01) | |
| *G06F 40/58* | (2020.01) | |
| *G10L 13/047* | (2013.01) | |
| *G10L 13/08* | (2013.01) | |

(52) U.S. Cl.
CPC ............ *G10L 13/02* (2013.01); *G06F 40/263* (2020.01); *G06F 40/284* (2020.01); *G06F 40/58* (2020.01); *G10L 13/047* (2013.01); *G10L 13/08* (2013.01); *G10L 13/086* (2013.01); *G10L 2013/083* (2013.01)

(58) Field of Classification Search
CPC ....... G10L 13/02; G10L 13/047; G10L 13/08; G10L 2013/083; G10L 13/086; G06F 40/58; G06F 40/263; G06F 40/284
See application file for complete search history.

(56) References Cited

U.S. PATENT DOCUMENTS

| | | | | |
|---|---|---|---|---|
| 9,798,653 | B1 * | 10/2017 | Shao | G10L 13/00 |
| 2003/0074196 | A1 * | 4/2003 | Kamanaka | G10L 13/07 |
| | | | | 704/260 |
| 2013/0238339 | A1 * | 9/2013 | Fleizach | G06F 40/263 |
| | | | | 704/260 |
| 2015/0186359 | A1 * | 7/2015 | Fructuoso | G10L 25/30 |
| | | | | 704/8 |
| 2017/0047060 | A1 * | 2/2017 | Liu | G10L 13/10 |
| 2019/0213995 | A1 * | 7/2019 | Li | G10L 13/08 |
| 2020/0380952 | A1 * | 12/2020 | Zhang | G10L 13/08 |
| 2022/0165249 | A1 * | 5/2022 | Wu | G10L 13/02 |
| 2024/0153482 | A1 * | 5/2024 | Sakata | G10L 13/02 |

FOREIGN PATENT DOCUMENTS

JP    2018206191 A    12/2018

* cited by examiner

*Primary Examiner* — Samuel G Neway
(74) *Attorney, Agent, or Firm* — Dorsey & Whitney LLP

(57) ABSTRACT

According to one or more embodiments, a non-transitory computer-readable medium including a program that, when executed, causes a server to perform functions including: converting a first text into a voice feature amount by inputting the first text into a learned conversion model, wherein the first text is in a different language from a predetermined language, the learned conversion model is pre-learned to convert a second text in the predetermined language into a voice feature amount, and synthesizing a voice from the converted voice feature amount.

5 Claims, 7 Drawing Sheets

NON-TRANSITORY COMPUTER-READABLE MEDIUM AND VOICE GENERATING SYSTEM

CROSS-REFERENCE TO RELATED APPLICATION

The present application claims priority to Japanese Patent Applications No. 2022-179503 filed on Nov. 9, 2022, and No. 2023-188581 filed on Nov. 2, 2023, the disclosures of which are expressly incorporated herein by reference in their entirety.

BACKGROUND

At least one embodiment of the disclosure relates to a non-transitory computer-readable medium containing a voice generating program and a voice generating system for performing functions to generate a voice from a text.

Conventionally, in video games, video works, and the like, characters and the like have been controlled to speak words in a fictional language. As one way to make a character speak words in a fictional language, there is one to generate a voice in a fictional language from a text in a real language.

For example, Japanese Patent Application Publication No. 2018-206191 discloses a configuration in which by dictionary data in which a character string of an existing language before conversion and a character string of a fictional language after conversion are associated with each other, a process to convert a text in an existing language into each predetermined character string is executed to generate a text in a fictional language and output the text as a voice.

However, in the configuration of Japanese Patent Application Publication No. 2018-206191, it is necessary to prepare dictionary data that associates converted character strings in a fictitious language with all character strings that may be included in the text to be converted into voice. For that reason, there has been a problem that as the number of types of character strings that may be included in the text to be converted into voice increases, the work burden on a developer who prepares the dictionary data increases.

It is an object of at least one embodiment of the disclosure to provide a non-transitory computer-readable medium containing a voice generating program and a voice generating system capable of generating a voice as a fictional language while suppressing an increase in the work burden on a developer.

SUMMARY

According to one non-limiting aspect of the disclosure, there is provided a non-transitory computer-readable medium including a program that, when executed, causes a server to perform functions including:
converting a first text into a voice feature amount by inputting the first text into a learned conversion model, wherein the first text is in a different language from a predetermined language, and the learned conversion model is pre-learned to convert a second text in the predetermined language into a voice feature amount; and
synthesizing a voice from the converted voice feature amount.

According to another non-limiting aspect of the disclosure, there is provided a voice generating system configured to execute processes to generate a voice from a text, the system including a communication network, a server, and a user terminal, the system further including:
a converter configured to convert a first text into a voice feature amount by inputting the first text into a learned conversion model, wherein the first text is in a different language from a predetermined language, and the learned conversion model is pre-learned to convert a second text in the predetermined language into a voice feature amount; and
a synthesizer configured to synthesize a voice from the converted voice feature amount.

According to still another non-limiting aspect of the disclosure, there is provided a non-transitory computer-readable medium including a program that when executed, causes a user terminal to perform functions comprising:
converting a first text into a voice feature amount by inputting the first text into a learned conversion model, wherein the first text is in a different language from a predetermined language, and the learned conversion model is pre-learned to convert a second text in the predetermined language into a voice feature amount; and
synthesizing a voice from the converted voice feature amount.

According to each embodiment of the disclosure, one or two or more problems are solved.

BRIEF DESCRIPTION OF DRAWINGS

The foregoing and other objects, features and advantages of the disclosure will become more readily apparent from the following detailed description of embodiments of the disclosure that proceeds with reference to the appending drawings.

DETAILED DESCRIPTION OF EMBODIMENTS

Hereinafter, example embodiments of the disclosure will be described with reference to the drawings. Note that various components in the respective embodiments described below can be appropriately combined without any contradiction or the like. In addition, the description of the content described as a certain embodiment may be omitted in another embodiment. Further, the content of an operation or processing that does not relate to features of each of the embodiments may be omitted. Moreover, the order of various processes that constitute various flows described below may be changed without any contradiction or the like of processing content.

First Embodiment

Figure 1:
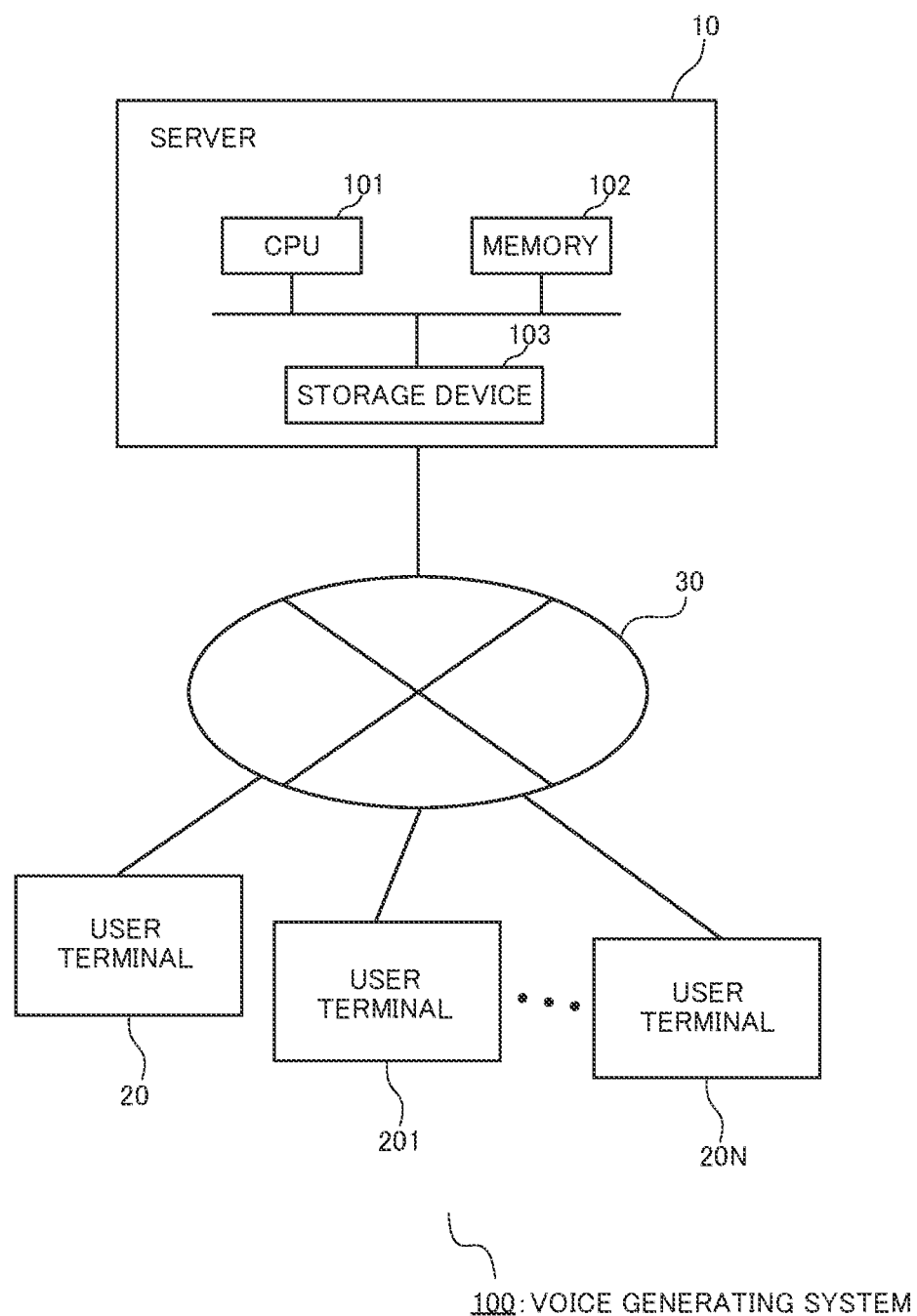
FIG. 1 is a block diagram illustrating an example of a configuration of a voice generating system according to at least one embodiment of the disclosure.

FIG. 1 is a block diagram illustrating an example of a configuration of a voice generating system 100 according to at least one embodiment of the disclosure. As illustrated in FIG. 1, the voice generating system 100 includes a voice generating server 10 (hereinafter, referred to as a "server 10") and user terminals 20, and 201 to 20N ("N" is an arbitrary integer) respectively used by users of the voice generating system 100. In this regard, the configuration of the voice generating system 100 is not limited to this configuration. The voice generating system 100 may be configured so that the plurality of users uses a single user terminal, or may be configured to include a plurality of servers.

Each of the server 10 and the plurality of user terminals 20 and 201 to 20N is connected to a communication network 30 such as the Internet. In this regard, although it is not illustrated in the drawings, the plurality of user terminals 20, and 201 to 20N is connected to the communication network 30 by executing data communication with base stations managed by a telecommunication carrier by means of a radio communication line.

The voice generating system 100 includes the server 10 and the plurality of user terminals 20 and 201 to 20N, whereby various kinds of functions for executing various kinds of processing.

The server 10 managed by an administrator of the voice generating system 100, and has various kinds of functions to provide information regarding various kinds of processing to the plurality of user terminals 20 and 201 to 20N. In the present embodiment, the server 10 is constructed by an information processing apparatus, such as a WWW server, and includes a storage medium for storing various kinds of information. A configuration of the server 10 is not limited particularly so long as the server 10 includes a general configuration for executing various kinds of processes as a computer, such as a control unit and a communication unit. Hereinafter, an example of a hardware configuration of the server 10 will be described briefly.

As illustrated in FIG. 1, the server 10 at least includes a Central Processing Unit (CPU) 101, a memory 102, and a storage device 103.

The CPU 101 is a central processing unit configured to execute various kinds of calculations and controls. In a case where the server 10 includes a Graphics Processing Unit (GPU), a part of the various kinds of calculations and controls may be executed by the GPU. The server 10 appropriately executes, by the CPU 101, various kinds of information processing required to generate voices by using data read out onto the memory 102, and stores obtained processing results in the storage device 103 as needed.

The storage device 103 has a function as a storage medium for storing various kinds of information. A configuration of the storage device 103 is not limited particularly. As one example, the storage device 103 may be configured to be capable of storing all of the various kinds of information required to generate voices from the viewpoint of reducing a processing load on each of the plurality of user terminals 20 and 201 to 20N. As such examples, there are an HDD and an SSD. However, a storage unit for storing the various kinds of information may be provided with a storage region in a state that the server 10 can access the storage region, for example, and may be configured to have a dedicated storage region outside the server 10.

Figure 2:
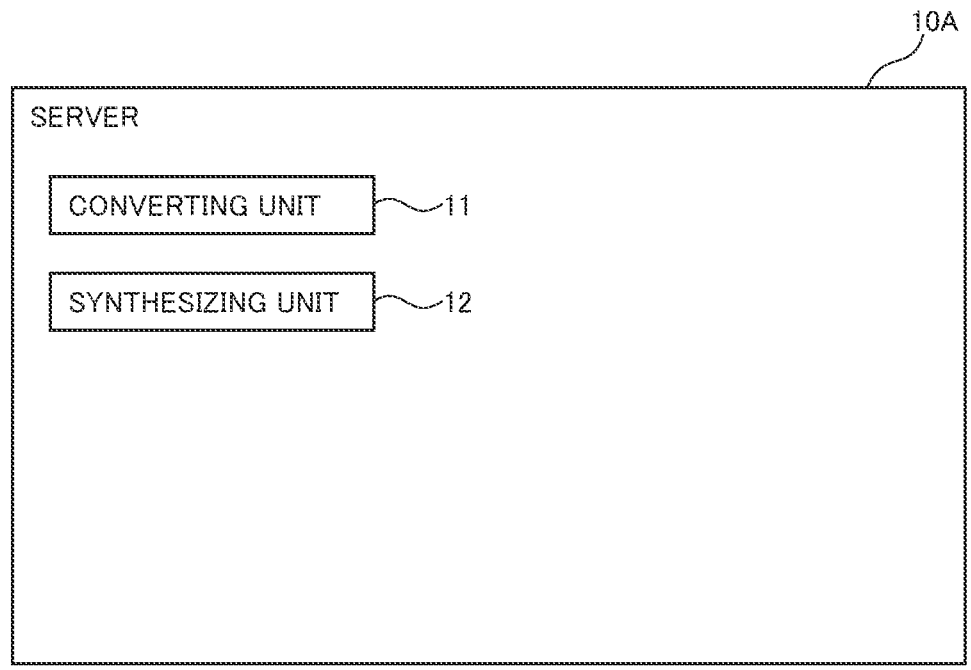
FIG. 2 is a block diagram illustrating a configuration of a server according to at least one embodiment of the disclosure.

FIG. 2 is a block diagram illustrating a configuration of a voice generating server 10A (hereinafter, referred to as a "server 10A"), which is an example of the voice generating server 10 according to at least one embodiment of the disclosure. As illustrated in FIG. 2, the server 10A at least includes a converting unit 11 and a synthesizing unit 12.

The converting unit 11 has a function to convert a first text, which is in a different language from a predetermined language, into a voice feature amount by inputting the first text into a learned conversion model, which is pre-learned to convert a second text in the predetermined language into a voice feature amount.

The language is not limited particularly so long as it is a natural language. Examples of the language include English, Japanese, and Chinese.

The voice feature amount may include an amount that represents a physical feature of a voice. The voice feature amount is not limited particularly so long as it can be utilized for a process of synthesizing a voice. Examples of the voice feature amount includes amplitude spectrograms and mel spectrograms.

The learned conversion model is not limited particularly so long as it has been learned in advance to convert a text in a predetermined language into a voice feature amount that can be utilized for the process of synthesizing a voice that pronounces the content of the text. Examples of the learned conversion model include a learned conversion model including: a model that has been learned in advance to extract a text feature amount from a text in a predetermined language; and a model that has been learned in advance to convert a voice feature amount from the extracted text feature amount. Examples of the text feature amount include phonemes, accents, mora positions, and temporal positions when a text is pronounced. As another example of the learned conversion model, there is a learned conversion model to directly convert a text in a predetermined language into a voice feature amount without executing extraction of a text feature amount. A neural network is used in the learned conversion model, for example.

In the present embodiment, learning that has been executed for a learned conversion model may include one that has been executed on the basis of elements specific to a predetermined language such as characters, grammar, and pronunciation of the predetermined language. In a case where a text in the predetermined language is converted into a voice feature amount by using the learned conversion model, a voice synthesized from the voice feature amount becomes a voice to pronounce the text as the predetermined language. On the other hand, in a case where a text in a different language from the predetermined language is converted into a voice feature amount by using the learned conversion model, a voice synthesized from the voice feature amount does not become a voice to pronounce the text as the different language from the predetermined language. For example, in a case where a text in Japanese is inputted into a learned conversion model for English (an English model), a synthesized voice does not become a voice as Japanese. This is because the learned conversion model for English converts the text into the voice feature amount on the basis of elements regarding English voices. This is because even in a case where the text in Japanese is inputted into the learned conversion model for English, the elements regarding English voices are reflected to a voice synthesized based on the text. Further, the voice synthesized in such a manner would not become a voice that cannot be heard as English. Therefore, it can be evaluated as a voice that is heard by a user as if it were a voice as a fictional language that does not actually exist. Hereinafter, a voice synthesized based on an input of a text in a different language from a predetermined language into the learned conversion model may be referred to as a "voice as a fictional language".

The different language from the predetermined language is not limited particularly so long as the languages can be recognized as being different from each other. Examples of the different language from the predetermined language include Japanese, Chinese, French, and Italian in a case where the predetermined language is English.

The synthesizing unit 12 has a function to synthesize a voice from the converted voice feature amount.

A configuration to synthesize a voice from a voice feature amount may be realized by a known technique. Therefore, detailed description thereof will be omitted.

Each of the plurality of user terminals 20, and 201 to 20N is managed by the user, and is configured by a cellular telephone terminal or a Personal Digital Assistant (PDA), for example. In this regard, the configuration of the user terminal that the voice generating system 100 can include is not limited to the example described above. Each of the user terminals 20, and 201 to 20N may be configured so that the user can recognize voices. As the other examples of the user terminal, there are one obtained by combining various kinds of communication terminals and a personal computer.

Each of the plurality of user terminals 20, and 201 to 20N is connected to the communication network 30, and includes hardware (for example, a display device for displaying a generation result screen of voices and the like) and software for executing various kinds of processes by communicating with the server 10A. In this regard, each of the plurality of user terminals 20, and 201 to 20N may be configured to be able to directly communicate with each other without the server 10A.

Next, an operation of the voice generating system 100 (hereinafter, referred to as the "system 100") according to the present embodiment will be described.

Figure 3:
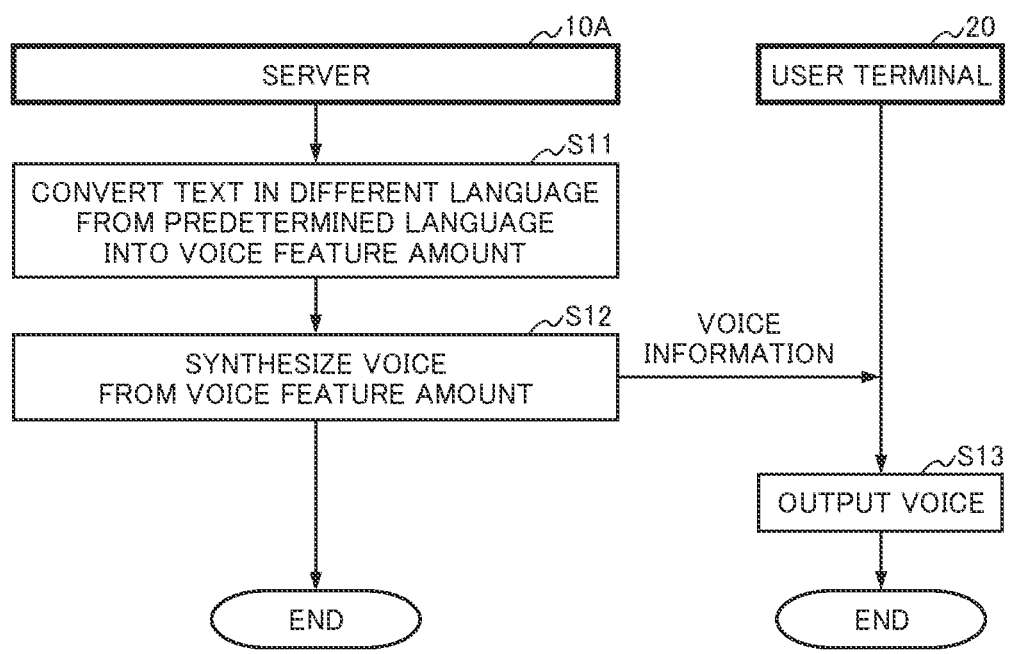
FIG. 3 is a flowchart illustrating an example of a voice generating process according to at least one embodiment of the disclosure.

FIG. 3 is a flowchart illustrating an example of a voice generating process according to at least one embodiment of the disclosure. In the voice generating process according to the present embodiment, processes related to generation of a voice from a text are executed. Hereinafter, a case where the server 10A and the user terminal 20 (hereinafter, referred to as the "terminal 20") execute the voice generating process will be described as an example.

The voice generating process is started, for example, in a case where the server 10A receives a voice generation request from a user.

In the voice generating process, the server 10A first converts a first text, which is in a different language from a predetermined language, into a voice feature amount by inputting the first text into a learned conversion model, which is pre-learned to convert a second text in the predetermined language into a voice feature amount (Step S11). In the present embodiment, as one example, the server 10A converts a Japanese text into a mel spectrogram by inputting the Japanese text into a learned conversion model that has been learned in advance to convert an English text into a voice feature amount.

When the first text is converted into the voice feature amount, the server 10A synthesizes a voice from the voice feature amount (Step S12). In the present embodiment, as one example, the server 10A synthesizes the mel spectrogram into a voice. Further, in the present embodiment, the server 10A transmits, to the terminal 20, voice information for causing the terminal 20 to output the synthesized voice.

When the voice information is received from the server 10A, the terminal 20 outputs the voice using a predetermined output device (Step S13). In the present embodiment, as one example, the terminal 20 outputs the voice using a speaker included in the terminal 20.

Figure 4:
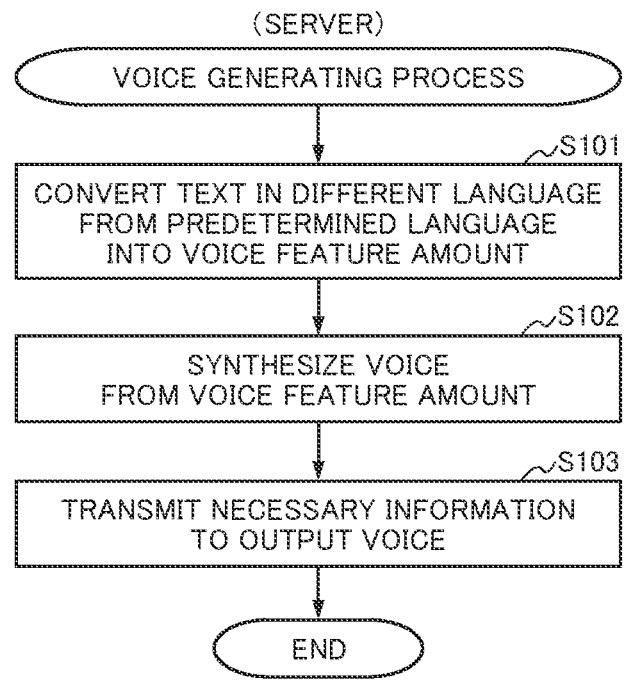
FIG. 4 is a flowchart illustrating an example of an operation of a server side in the voice generating process according to at least one embodiment of the disclosure.

FIG. 4 is a flowchart illustrating an example of an operation of a server side in the voice generating process according to at least one embodiment of the disclosure. Here, an operation of the server 10A in the voice generating system 100 will be described again.

In the voice generating process, the server 10A first converts a first text, which is in a different language from a predetermined language, into a voice feature amount by inputting the first text into a learned conversion model, which is pre-learned to convert a second text in the predetermined language into a voice feature amount (Step S101), and synthesizes a voice from the voice feature amount (Step S102). Then, the server 10A transmits information necessary for outputting the voice (Step S103), and terminates the processes herein.

Figure 5:
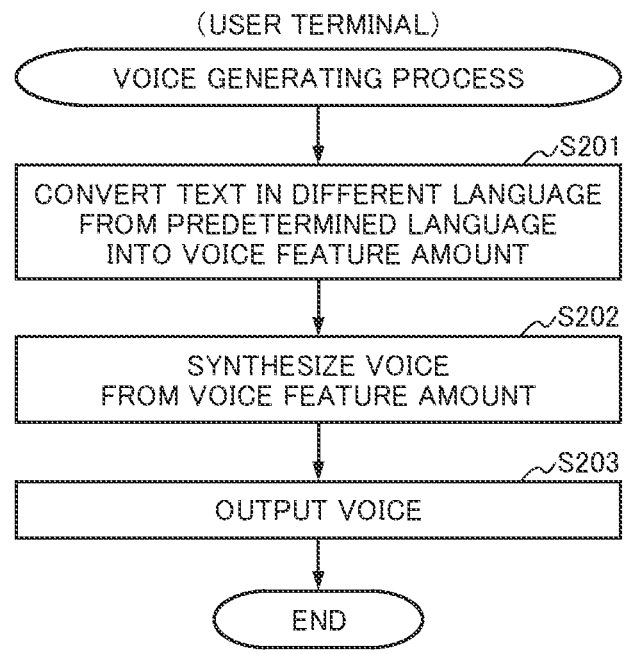
FIG. 5 is a flowchart illustrating an example of an operation of a terminal side in the voice generating process according to at least one embodiment of the disclosure.

FIG. 5 is a flowchart illustrating an example of an operation of a user terminal side in the voice generating process according to at least one embodiment of the disclosure. As one example, a case where the terminal 20 executes the voice generating process by a single body will be described. The configuration of the terminal 20 includes similar functions to those of the server 10A except that the terminal 20 receives various kinds of information from the server 10A. Its explanation is hence omitted from a point of view to avoid repeated explanation.

In the voice generating process, the terminal 20 first converts a first text, which is in a different language from a predetermined language, into a voice feature amount by inputting the first text into a learned conversion model, which is pre-learned to convert a second text in the predetermined language into a voice feature amount (Step S201), and synthesizes a voice from the voice feature amount (Step S202). Then, the terminal 20 outputs the synthesized voice (Step S203), and terminates the processes herein.

As explained above, as one side of the first embodiment, the server 10A that has functions to generate a voice from a text is configured to at least include the converting unit 11 and the synthesizing unit 12. The converting unit 11 converts a first text, which is in a different language from a predetermined language into a voice feature amount by inputting the first text into a learned conversion model, which is pre-learned to convert a second text in the predetermined language into a voice feature amount, and the synthesizing unit 12 synthesizes a voice from the voice feature amount.

Therefore, it becomes possible to generate a voice as a fictional language while suppressing an increase in the work burden on the developer.

The voice synthesized from the text in the language, which is different from the predetermined language corresponding to the learned conversion model, neither becomes a voice to pronounce the text as the different language from the predetermined language nor a voice that can be heard as the predetermined language. Therefore, the synthesized voice can be evaluated as a voice that is heard by a user as if it were a voice as a fictional language that does not actually exist. Further, since a dictionary for a fictional language is not required to generate a voice from a text, there is no need to prepare character strings in the fictional language according to types of character strings that may be included in a text in order to generate a voice in the fictional language. Therefore, it is possible to suppress the work burden for generating a voice in a fictional language as compared with the conventional configuration.

Second Embodiment

Figure 6:
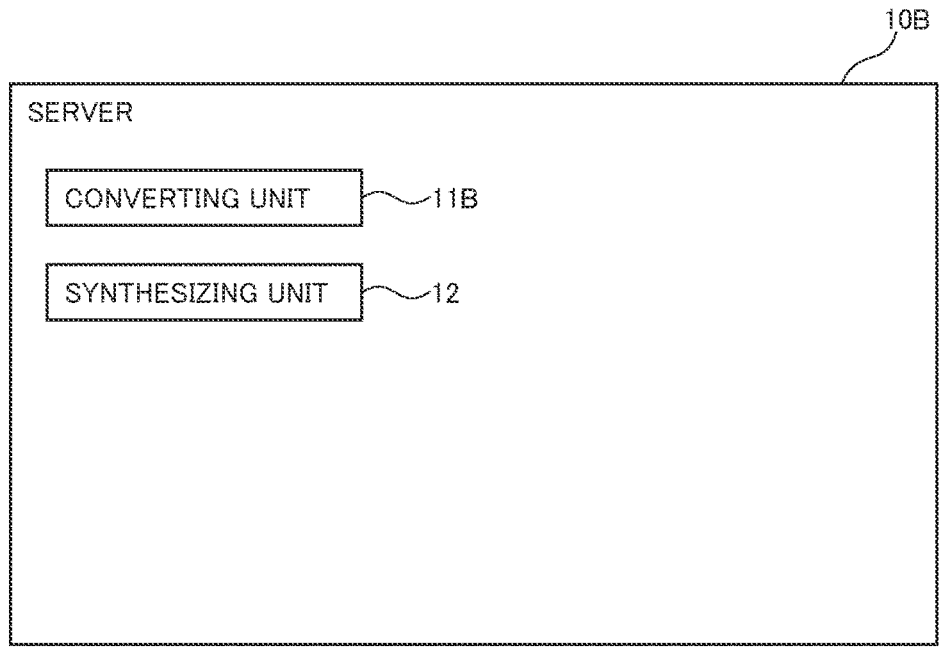
FIG. 6 is a block diagram illustrating a configuration of a server according to at least one embodiment of the disclosure.

FIG. 6 is a block diagram illustrating a configuration of a voice generating server 10B (hereinafter, referred to as a "server 10B"), which is an example of the voice generating server 10, according to at least one embodiment of the disclosure. In the present embodiment, the server 10B at least includes a converting unit 11 and a synthesizing unit 12.

The converting unit 11B has a function to convert a character that belongs to a predetermined language in an inputted first text into a token by using a learned conversion model, and convert a character that does not belong to the predetermined language in the inputted first text into a numerical value in accordance with a predetermined rule. The converting unit 11B also has a function to convert the converted token and the converted numerical value into the voice feature amount.

The character that belongs to the predetermined language may include a character used as the predetermined language. The character that belongs to the predetermined language is not limited particularly. It may be a single character used as the predetermined language, or may be one (that is a word) obtained by combining a plurality of characters used as the predetermined language. As an example of the character belonging to the predetermined language, in a case where the predetermined language is English, there are an alphabetic character belonging to English (hereinafter, referred to as an "English character") and an English word.

The token may include an element as a basic unit that constitutes a text of a natural language. A method of determining a token is not limited particularly. A single character or a word belonging to a predetermined language may be treated as a token, or a phoneme belonging to a predetermined language may be treated as a token.

A configuration to convert a character that belongs to a predetermined language into a token is not limited particularly. The configuration may be a configuration to treat each character obtained by dividing a plurality of characters belonging to a predetermined language in character units as a token, or a configuration to treat a single phoneme obtained by converting a character belonging to a predetermined language into at least one phoneme as a token.

The character that does not belong to the predetermined language may include a character that cannot be used as the predetermined language. The character that does not belong to the predetermined language is not limited particularly. It may be a single character that cannot be used as the predetermined language, or one (that is a word) obtained by combining a plurality of characters including a character that cannot be used as the predetermined language. As examples of the character not belonging to the predetermined language, in a case where the predetermined language is English, there are Japanese hiragana, katakana, kanji, and Japanese words.

Converting a character that does not belong to a predetermined language into a numerical value in accordance with a predetermined rule may include converting a character that does not belong to a predetermined language into a numerical value that complies with a predetermined information form for executing a process of converting into a voice feature amount. The predetermined rule is not limited particularly. It may have a configuration in which a character not belonging to a predetermined language is converted into a numerical value corresponding to a character belonging to the predetermined language, or a configuration in which a character not belonging to a predetermined language is converted into a numerical value corresponding to a character not belonging to the predetermined language. As an example of the predetermined rule, there is one in which a character belonging to Japanese is converted into a character code belonging to English. In this regard, examples of the configuration to specify the character code after conversion include a configuration to specify a character code corresponding to an English character whose pronunciation is similar to a character before conversion, and a configuration to specify a character code corresponding to an English character at random. As another example of the predetermined rule, there is a rule to refer to a storage unit that stores information in which Japanese characters and numerical values are associated with each other to convert a character belonging to Japanese into a numerical value corresponding to the character.

A configuration to convert a token and a numerical value into voice feature amounts is not limited particularly so long as it is a configuration to convert a numerical value converted from a character not belonging to a predetermined language into any voice feature amount. As an example of such a configuration, there is a configuration to further convert a numerical value converted from a token and a numerical value converted from a character not belonging to a predetermined language into a vector of a predetermined dimension in order to match an input form of a neural network used in a learned conversion model, and input the vector into the neural network to convert into a voice feature amount.

Figure 7:
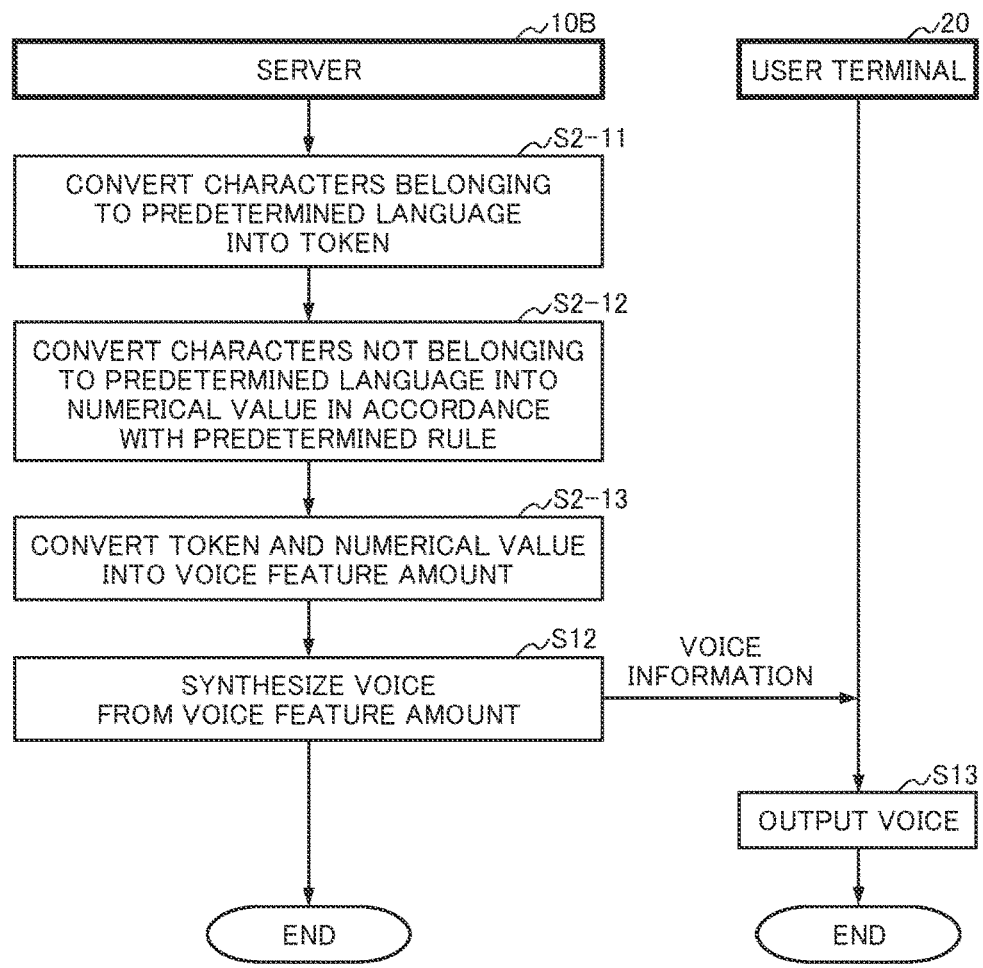
FIG. 7 is a flowchart illustrating an example of a voice generating process according to at least one embodiment of the disclosure.

FIG. 7 is a flowchart illustrating an example of a voice generating process according to at least one embodiment of the disclosure. As one example, operations of the server 10B and the terminal 20 will be described. A flowchart illustrating an operation of each of the server 10B and the terminal 20 is omitted from a point of view to avoid repeated explanation thereof.

The voice generating process is started, for example, in a case where the server 10B receives a voice generation request from a user.

In the voice generating process, the server 10B first converts a character that belongs to a predetermined language in an inputted first text into a token by using a learned conversion model (Step S2-11). In the present embodiment, in a case where an English character is included in an inputted Japanese text, the server 10B converts the English character into a phoneme belonging to English, and treats the phoneme as a token.

When the character belonging to the predetermined language is converted into the token, the server 10B converts a character that does not belong to the predetermined language into a numerical value in accordance with a predetermined rule (Step S2-12). In the present embodiment, the server 10B converts a character belonging to Japanese into a character code belonging to English.

When the character not belonging to the predetermined language is converted into the numerical value in accordance with the predetermined rule, the server 10B converts the converted token and the converted numerical value into voice feature amounts (Step S2-13). In the present embodiment, the server 10B converts a token into a numerical value; further converts the numerical value into a vector of a predetermined dimension; and converts the vector of the predetermined dimension into a mel spectrogram by using at least one neural network.

As explained above, as one side of the second embodiment, the server 10B that has functions to generate a voice from a text is configured to at least include the converting unit 11B and the synthesizing unit 12. Thus, the converting unit 11B converts the character that belongs to the predetermined language in the inputted first text into the token by using the learned conversion model; converts the character that does not belong to the predetermined language in the inputted first text into the numerical value in accordance with the predetermined rule; and converts the converted token and the converted numerical value into the voice feature amounts. Therefore, by additionally defining a process when a character not belonging to a predetermined language is inputted into a learned model used in Text to Speech (TTS) for the learned model, even though the character not belonging to the predetermined language is inputted into the learned model, a text in a different language from the predetermined language is converted into a voice feature amount without causing an error and without ignoring the character not belonging to the predetermined language. In this manner, it is possible to generate a voice as a fictional language. Thus, a developer no longer needs to carry out a work to prepare character strings of the fictional language. Therefore, there is no need to prepare character strings after conversion (that is, character strings of a fictional language) by an increase in the number of types of character strings that may be included in a text before conversion, and this makes it possible to suppress an increase in the work burden on the developer.

Third Embodiment

Figure 8:
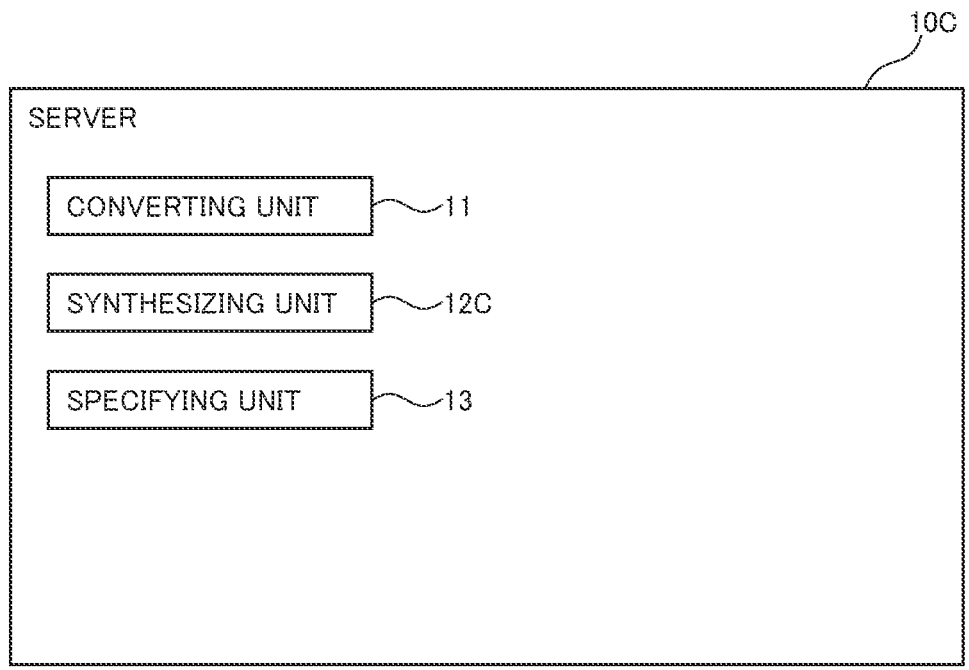
FIG. 8 is a block diagram illustrating a configuration of a server according to at least one embodiment of the disclosure.

FIG. 8 is a block diagram illustrating a configuration of a voice generating server 10C (hereinafter, referred to as a "server 10C"), which is an example of the voice generating server 10 according to at least one embodiment of the disclosure. In the present embodiment, the server 10C at least includes a converting unit 11, a synthesizing unit 12C, and a specifying unit 13.

The specifying unit 13 has a function to refer to a storage unit that stores reserved word information in which a word registered in a predetermined storage region (hereinafter, referred to as a "reserved word") is associated with a voice or a specifying method of the voice, and specify a reserved word in a text of a different language from a predetermined language (hereinafter, referred to as a "different language text").

The reserved word is not limited to a character or a character string defined in advance by a developer or users. One or more reserved words are materials for generating voices. Thus, the one or more reserved words may include not only single characters or strings of characters, which are the smallest linguistic units with grammatical meaning or function, but also characters and numbers that have no grammatical meaning or are considered to be misspelled. Examples of the reserved word include proper nouns such as town names and character names that appear in video games. In this regard, a language to which the reserved word belongs is not limited particularly. The language may be a different language from the predetermined language, or may be the predetermined language.

A configuration to register the reserved word in the predetermined storage region is not limited particularly. The configuration may be a configuration in which the reserved word is stored in a storage region to which the specifying unit 13 can refer. As an example of such a configuration, there is a configuration in which a request to register a reserved word to a storage region provided in the server 10C is received.

The voice contained in the reserved word information may include a voice generated in advance until a process of synthesizing the voice executed by the synthesizing unit 12C, and may include a voice of the word associated with the voice itself in the reserved word information.

The specifying method of the voice contained in the reserved word information may include a method of specifying a voice of a reserved word by synthesizing the voice. The specifying method of the voice is not limited particularly so long as it is a method of generating the voice of the reserved word. As an example of the specifying method of the voice, there is a method of using a learned model that has been learned in advance to convert a text of a language to which the reserved word belongs into a voice feature amount representing a physical feature of a voice for the text of the language. This learned model is a method of specifying a voice feature amount that becomes a material for synthesizing the voice of the reserved word, whereby it is possible to synthesize the voice of the reserved word from the voice feature amount.

A configuration to specify the reserved word in the different language text is not limited particularly. The configuration may be a configuration to specify the same word as a reserved word contained in reserved word information among one or more words in a different language text, or may be a configuration to specify the same word as a word satisfying a predetermined condition among one or more reserved words contained in reserved word information.

The synthesizing unit 12C has a function to change a portion, which corresponds to the reserved word, of the voice synthesized from the voice feature amount into a voice that corresponds to the reserved word.

The portion corresponding to the reserved word may include a portion in which a voice is synthesized on the basis of a reserved word in a voice synthesized based on a different language text. The portion corresponding to the reserved word is not limited particularly so long as the portion is a portion that can be distinguished from the other portions in the voice synthesized based on the different language text. It may be a portion in which a voice is generated on the basis of a reserved word, or may be a portion in which a voice based on a reserved word is not generated. As an example of a configuration to generate the portion in which the voice based on the reserved word is not generated, there is a configuration in which when a different language text is converted into a voice feature amount, the converting unit 11 does not convert a reserved word into a voice feature amount to become a blank (a state where voice data does not exist). As an example of a configuration in which the synthesizing unit 12C specifies a portion corresponding to the reserved word, there is a configuration in which the converting unit 11 generates information by which a portion corresponding to reserved word can be specified when a different language text is converted into a voice feature amount.

The voice corresponding to the reserved word may include a voice specified by a voice or a specifying method of the voice associated with a reserved word in reserved word information.

A configuration to change a portion corresponding to a reserved word into a voice corresponding to the reserved word is not limited particularly so long as it is a configuration in which as a result, the voice corresponding to the reserved word exists in the portion. As an example of such a configuration, there are a configuration in which a voice that exists in a portion corresponding to a reserved word is replaced by a voice corresponding to the reserved word, and a configuration in which when a voice does not exist in a portion corresponding to a reserved word, a voice corresponding to the reserved word is inserted into the portion.

Figure 9:
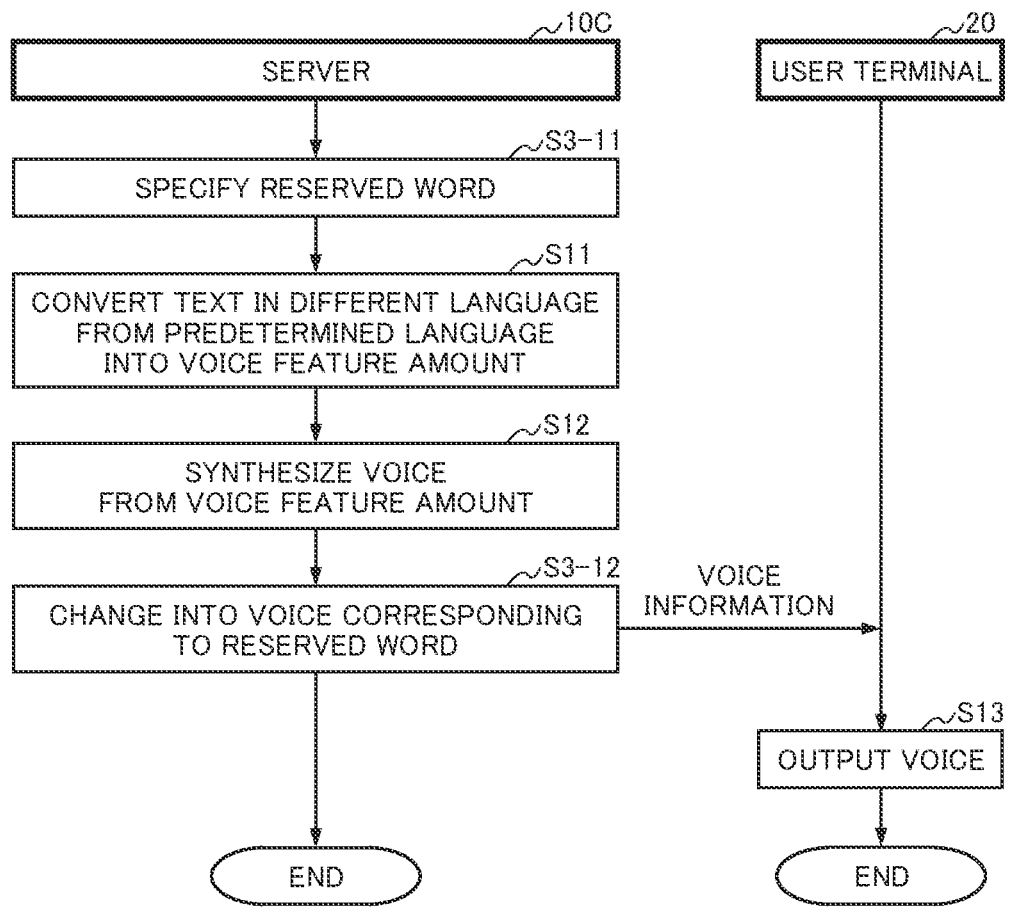
FIG. 9 is a flowchart illustrating an example of a voice generating process according to at least one embodiment of the disclosure.

FIG. 9 is a flowchart illustrating an example of a voice generating process according to at least one embodiment of the disclosure. Hereinafter, operations of the server 10C and the terminal 20 will be described as an example. In this regard, a flowchart illustrating an operation of each of the server 10C and the terminal 20 is omitted from a point of view to avoid repeated explanation thereof.

In the voice generating process, the server 10C first refers to a storage unit that stores reserved word information in which a reserved word is associated with a voice or a specifying method of the voice to specify a reserved word in a different language text (Step S3-11). In the present embodiment, the server 10C specifies the same word as the reserved word contained in the reserved word information from one or more words in the different language text.

When a voice is synthesized from a voice feature amount, the server 10C changes a portion, which corresponds to the reserved word, of the voice synthesized from the voice feature amount into a voice that corresponds to the reserved word (Step S3-12). In the present embodiment, the server 10C replaces the voice existing in the portion corresponding to the reserved word into the voice corresponding to the reserved word. Further, in the present embodiment, the server 10C transmits, to the terminal 20, voice information for causing the terminal 20 to output the synthesized voice.

As explained above, as one side of the third embodiment, the server 10C that has functions to generate a voice from a text is configured to at least include the converting unit 11, the synthesizing unit 12C, and the specifying unit 13. Thus, the specifying unit 13 refer to the storage unit that stores the reserved word information in which the reserved word associated with the voice or the specifying method of the voice to specify the reserved word in the different language text; and the synthesizing function 12C changes the portion, which corresponds to the reserved word, of the voice synthesized from the voice feature amount into the voice that corresponds to the reserved word. Therefore, it becomes possible to cause a user to understand at least a part of a voice as a fictional language. For that reason, it becomes possible to prompt the user to guess the content of the voice as the fictional language.

Fourth Embodiment

Figure 10:
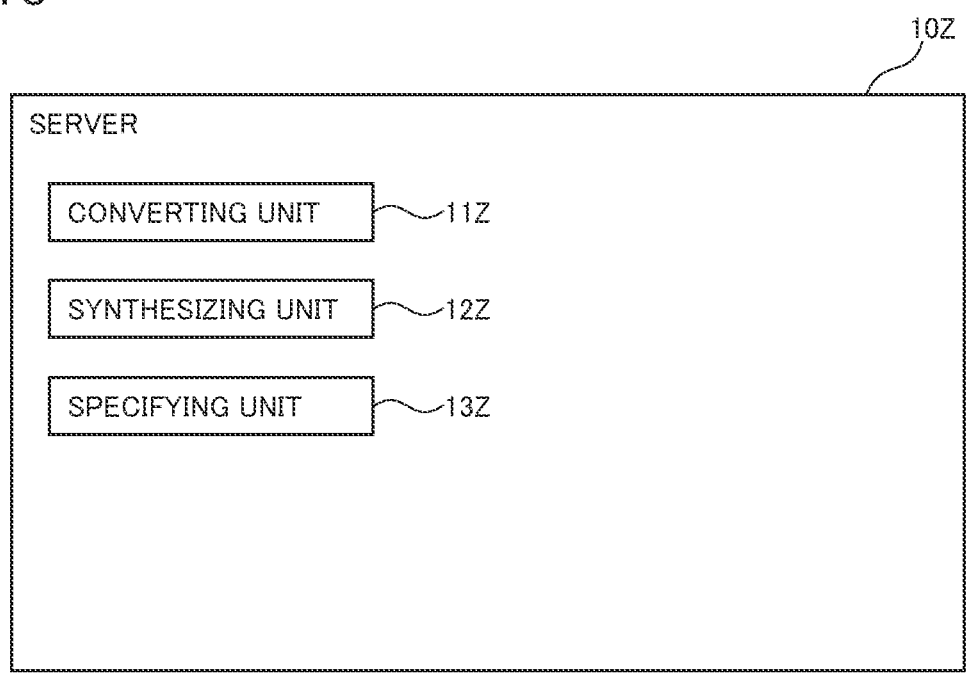
FIG. 10 is a block diagram illustrating a configuration of a server according to at least one embodiment of the disclosure.

FIG. 10 is a block diagram illustrating a configuration of a voice generating server 10Z (hereinafter, referred to as a "server 10Z"), which is an example of the voice generating server 10 according to at least one embodiment of the disclosure. In the present embodiment, the server 10Z at least includes a converting unit 11Z, a synthesizing unit 12Z, and a specifying unit 13Z.

The converting unit 11Z has a function to input a first text in a different language from a predetermined language (herein may also be referred to as a "different language text") into a learned conversion model, which is pre-learned to convert a second text in the predetermined language (herein may also be referred to as a "predetermined language text") into a voice feature amount, to convert the different language text into a voice feature amount.

The language is not limited particularly so long as it is a natural language. Examples of the language include English, Japanese, Chinese, French, and Italian. As one example, a case where a predetermined language (that is, a language corresponding to a learned conversion model) is English will be described.

The voice feature amount may include an amount that represents a physical feature of a voice. Examples of the voice feature amount includes amplitude spectrograms and mel spectrograms.

The learned conversion model is not limited particularly so long as it has been learned in advance to convert a predetermined language text into a voice feature amount. As one example, a case where a learned conversion model is a model that has been learned in advance to convert an English text (as the predetermined language text) into a voice feature amount and uses Tacotron2 will be described. Tacotron2 is a model using a neural network, and is a model to directly convert a text into a voice feature amount without executing extraction of a text feature amount.

In this regard, the learned conversion model may be a learned conversion model including a model that has been learned in advance to extract a text feature amount from a predetermined language text and a model that has been learned in advance to convert a voice feature amount from the extracted text feature amount. Examples of the text feature amount include phoneme and accents for a word or a character, mora positions, and temporal positions in a text inputted into a learned conversion model.

In the present embodiment, learning that has been executed for a learned conversion model is one that has been executed on the basis of elements specific to a predetermined language such as characters, grammar, and pronunciation of the predetermined language. In a case where a text in a predetermined language is converted into a voice feature amount by using a learned conversion model, a voice synthesized from the voice feature amount becomes a voice to pronounce the text as the predetermined language. On the other hand, in a case where a text in a different language from a predetermined language is converted into a voice feature amount by using a learned conversion model, a voice synthesized from the voice feature amount does not become a voice to pronounce the text as the different language from the predetermined language. For example, in a case where a text in Japanese is inputted into a learned conversion model for English, a synthesized voice does not become a voice as Japanese. This is because the learned conversion model for English converts a text into a voice feature amount on the basis of elements regarding English voices. This is because even in a case where a text in Japanese is inputted into the learned conversion model for English, the elements regarding English voices are reflected to a voice synthesized based on the text. Further, a voice synthesized in such a manner would not become a voice that cannot be heard as English.

Therefore, it can be evaluated as a voice that is heard by a user as if it were a voice as a fictional language that does not actually exist. Hereinafter, a voice synthesized based on an input of a text in a different language from a predetermined language into a learned conversion model may be referred to as a "voice as a fictional language".

The different language from the predetermined language is not limited particularly so long as the languages can be recognized as being different from each other. Examples of the different language from the predetermined language include Japanese, Chinese, French, and Italian in a case where a predetermined language is English. As one example, a case where the different language from the predetermined language is Japanese will be described.

The converting unit 11Z has a function to convert a character that belongs to a predetermined language in an inputted text into a token by using a learned conversion model, and convert a character that does not belong to the predetermined language in accordance with a predetermined rule. The converting unit 11B also has a function to convert the converted token and the converted numerical value into voice feature amounts.

The character that belongs to the predetermined language may include a character used as the predetermined language. As one example, a case where the character that belongs to the predetermined language is an alphabetic character belonging to English (hereinafter, referred to also as an "English character") will be described.

The token may include an element as a basic unit that constitutes a text of a natural language. A method of determining a token is not limited particularly. A single character or a word belonging to a predetermined language may be treated as a token, or a phoneme belonging to a predetermined language may be treated as a token. Hereinafter, a case where a single English character is treated as a token will be described as an example.

A configuration to convert a character that belongs to a predetermined language into a token is not limited particularly. The configuration may be a configuration to treat each character obtained by dividing a plurality of characters belonging a predetermined language in character units as a token, or a configuration to treat a single phoneme obtained by converting a character belonging to a predetermined language into at least one phoneme as a token. As examples of the configuration to convert a character belonging to a predetermined language into a token, there is a configuration in which in a case where a part of a Japanese text is an English character, the single English character is treated as a token, and a configuration in which in a case where a predetermined language is Chinese and a different language from the predetermined language is Japanese, kanji existing in Chinese in an inputted Japanese text is converted into a token in kanji unit.

The character that does not belong to the predetermined language may include a character that cannot be used as the predetermined language. Hereinafter, a case where a character not belonging to a predetermined language is hiragana, katakana, or kanji not belonging to English will be described as an example.

Converting a character that does not belong to a predetermined language into a numerical value in accordance with a predetermined rule may include converting a character that does not belong to a predetermined language into a numerical value that complies with a predetermined information form for executing a process of converting into a voice feature amount. Hereinafter, a case where hiragana, katakana, and kanji that cannot be tokenized by an English tokenizer (that is, characters that are "Out Of Vocabulary" by the English tokenizer) are converted into character codes of English characters selected at random from character codes of ASCII in accordance with a predetermined rule will be described as an example. In this regard, as another example of the predetermined rule, there is a rule to convert a Japanese text into a token in character units or phoneme units by a Japanese tokenizer, refer to a storage unit that stores information in which a character belonging to Japanese and a numerical value are associated with each other, and convert the character belonging to Japanese into a numerical value corresponding to the character. In this regard, as an example of the configuration to convert a Japanese text into a token, there is a configuration to convert a word having predetermined frequency of Japanese words into a token in word units, and convert a word having frequency less than the predetermined frequency into a token in character units (subword tokenization). By configuring the converting unit 11Z in this manner, it becomes possible to keep both reduction of a processing load by reduction of the number of tokens that are targets of a converting process based on conversion into a token in word units and improvement of the possibility of dealing with unknown words by conversion into a token in character units.

A configuration to convert a token and a numerical value into voice feature amounts is not limited particularly so long as it is a configuration to convert a numerical value converted from a character not belonging to a predetermined language into any voice feature amount. In the present embodiment, a configuration to convert a token and a numerical value into voice feature amounts includes a configuration to convert in a case where an English character is included in a Japanese text, the English character into an ASCII character code, and convert the ASCII character code converted from the Japanese text into a vector of a predetermined dimension (that is, embedding vector therein). Further, in the present embodiment, the configuration to convert a token and a numerical value into voice feature amounts includes a configuration to input the converted vector of the predetermined dimension into a neural network that has been learned in advance to convert vectors of a predetermined dimension into voice feature amounts to convert the vector into a voice feature amount.

The synthesizing unit 12Z has a function to synthesize a voice from the converted voice feature amount.

A configuration to synthesize a voice from a voice feature amount may be realized by a known technique. As an example of the configuration to synthesize a voice from a voice feature amount, there is a configuration to utilize a Wavenet vocoder to synthesize a voice from a voice feature amount. In the present embodiment, the converting unit 11Z and the synthesizing unit 12Z synthesize an English-like voice (a voice as a fictional language) from a Japanese text.

The synthesizing unit 12Z has a function to change a portion, which corresponds to a word registered in a predetermined storage region (herein may also be referred to as a "reserved word"), of a voice synthesized from the voice feature amount into a voice that corresponds to the reserved word.

The reserved word is not limited particularly so long as it is a character or a character string defined in advance by a developer or users. One or more reserved words are materials for generating voices. Thus, the one or more reserved words may include not only single characters or strings of characters, which are the smallest linguistic units with grammatical meaning or function, but also characters and numbers that have no grammatical meaning or are considered to be misspelled. Examples of the reserved word include proper nouns such as town names and character names that appear in video games. In this regard, a language to which the reserved word belongs is not limited particularly. The language may be a different language from the predetermined language, or may be the predetermined language. For example, by setting a language belonging to the reserved word is Japanese and also setting the predetermined language to Japanese, it is possible to realize a case where "by a Japanese-like fictional language, even though a Japanese speaker listens a voice, the Japanese speaker cannot understand the content thereof, but can understand portions of Japanese people's names".

The portion corresponding to the reserved word may include a portion in which a voice of voices synthesized based on a different language text is synthesized on the basis of a reserved word. The portion corresponding to the reserved word is not limited particularly so long as it can be distinguished from the other portions in the voice synthesized based on the different language text. It may be a portion in which a voice is synthesized on the basis of a reserved word, or may be a portion in which a voice is not synthesized on the basis of a reserved word (for example, a blank). A configuration to specify a portion corresponding to a reserved word in the synthesized voice is not limited particularly. For example, a known technique such as a method of determining a token for specifying a reserved word (a token for a reserved word) may be used. Therefore, detailed description thereof will be omitted herein.

The voice corresponding to the reserved word may include a voice specified by a voice or a specifying method of the voice associated with a reserved word. The voice corresponding to the reserved word may be pronunciation as a different language from a predetermined language. Hereinafter, a case where when a Japanese text is inputted into a learned model corresponding to English, pronunciation as Japanese for a reserved word is outputted will be described as an example.

The specifying method of the voice associated with the reserved word may include a method of specifying a voice of a reserved word by synthesizing the voice. The specifying method of the voice is not limited particularly so long as it is a method of synthesizing the voice of the reserved word. As an example of the specifying method of the voice, there is a method of using a learned model that has been learned in advance to convert a text of a language to which the reserved word belongs into a voice feature amount.

A configuration to change a portion corresponding to a reserved word into a voice corresponding to the reserved word is not limited particularly so long as it is a configuration in which as a result, the voice corresponding to the reserved word exists in a portion corresponding to the reserved word. As one example, a configuration to exchange a voice existing a portion corresponding to a reserved word into a voice corresponding to the reserved word will be described.

The specifying unit 13Z has a function to refer to a storage unit that stores reserved word information in which a reserved word is associated with a voice or a specifying method of the voice to specify a reserved word in a different language text.

A configuration to specify the reserved word in the different language text is not limited particularly. The configuration may be a configuration to specify the same word as a reserved word contained in reserved word information among one or more words in a different language text, or may be a configuration to specify the same word as a word satisfying a predetermined condition among one or more reserved words contained in reserved word information.

Figures 11, 12:
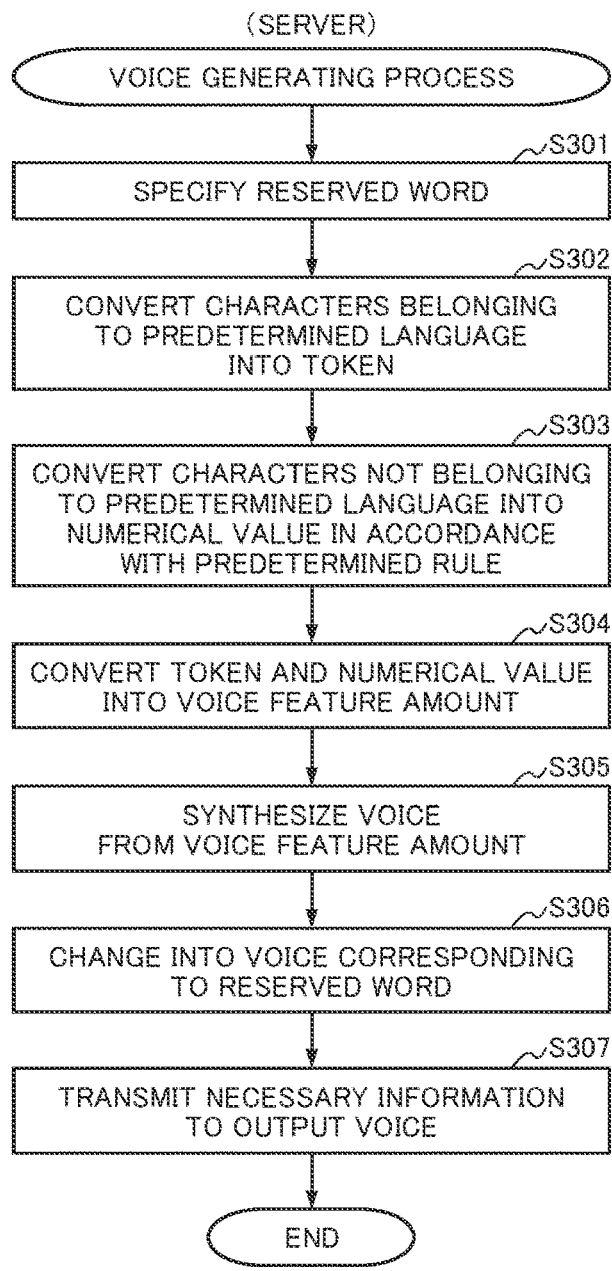
FIG. 11 is a flowchart illustrating an example of a voice generating process according to at least one embodiment of the disclosure.
FIG. 12 is an explanatory drawing for explaining an example of a storage state of information according to at least one embodiment of the disclosure.

FIG. 11 is a flowchart illustrating an example of a voice generating process according to at least one embodiment of the disclosure. In the voice generating process according to the present embodiment, processes related to generation of a voice from a text are executed. As one example, each of the processes will be described. The order of the respective processes may be changed without any contradiction or the like of processing content.

The voice generating process is started, for example, in a case where a user requests the server 10Z to generate a voice.

In the voice generating process, the server 10Z first refers to a storage unit that stores reserved word information in which a reserved word is associated with a voice or a specifying method of the voice to specify a reserved word in a different language text (Step S301). In the present embodiment, the server 10Z specifies the same word as a reserved word contained in reserved word information in a Japanese text.

When the reserved word is specified, the server 10Z converts a character that belongs to a predetermined language in an inputted text into a token (Step S302). In the present embodiment, in a case where a character belonging to English as the predetermined language is included in the Japanese text, the server 10Z divides the character in English character units and treats the divided English character as a token. Further, in the present embodiment, the server 10Z converts the specified reserved word into a token for a reserved word.

When the character belonging to the predetermined language is converted into the token, the server 10Z converts a character that does not belong to the predetermined language in the inputted text into a numerical value in accordance with a predetermined rule (Step S303). In the present embodiment, the server 10Z converts hiragana, katakana, and kanji in the Japanese text into ASCII character codes.

When the character not belonging to the predetermined language is converted into the numerical value in accordance with the predetermined rule, the server 10Z converts the converted token and the converted numerical value into voice feature amounts (Step S304). In the present embodiment, the server 10Z uses Tacotron2 to convert the token and the numerical value into a mel spectrogram.

When the token and the numerical value are converted into the voice feature amounts, the server 10Z synthesizes a voice from the voice feature amount (Step S305). In the present embodiment, the server 10Z uses a Wavenet vocoder to synthesize the mel spectrogram into a voice.

When the voice is synthesized from the voice feature amount, the server 10Z changes a portion corresponding to a reserved word in the synthesized voice into a voice corresponding to the reserved word (Step S306). In the present embodiment, the server 10Z changes the voice generated based on the token for the reserved word into a voice corresponding to the reserved word.

When the server 10Z changes the portion corresponding to the reserved word into the voice corresponding to the reserved word, the server 10Z transmits information necessary to output the changed voice (Step S307), and terminates the processes herein. In the present embodiment, the server 10Z transmits information necessary to output the voice to the terminal 20. A method of outputting the voice in the terminal 20 is not limited particularly. One example is to have a configuration in which the outputted voice can be listened as a fictional language. As an example of such a configuration, there is a configuration in which a voice is outputted so that the outputted voice matches mouth movement of a character in a video game. Further, in order for a user to grasp a relationship between an input text and a voice treated as a fictional language, the input text is displayed in order from the beginning of a sentence, and a voice is outputted in accordance with the display.

As explained above, as one side of the fourth embodiment, the server 10Z that has functions to generate a voice from a text is configured to at least include the converting unit 11Z, the synthesizing unit 12Z, and the specifying unit 13Z. The converting unit 11Z inputs a first text in a different language (for example, Japanese) from a predetermined language (for example, English) into a learned conversion model (for example, an English model), which is pre-learned to convert a second text in the predetermined language into a voice feature amount, to convert the inputted first text into a voice feature amount; and the synthesizing unit 12Z synthesizes a voice (for example, an English-like voice) from the converted voice feature amount. Therefore, it becomes possible to generate a voice as a fictional language while suppressing an increase in the work burden on the developer.

The voice synthesized from the text, which is in the language (different language) different from the language (predetermined language) corresponding to the learned conversion model, neither becomes a voice to pronounce the text as the different language from the predetermined language nor a voice that can be heard as the predetermined language. For that reason, it can be evaluated as a voice that is heard by a user as if it were a voice as a fictional language that does not actually exist. Furthermore, since a dictionary for a fictional language is not required to generate a voice from a text, there is no need to prepare character strings in the fictional language according to types of character strings that may be included in a text in order to generate a voice in the fictional language. Therefore, it is possible to suppress the work burden for generating a voice in a fictional language as compared with the conventional configuration.

Further, a length of time of the voice (a voice length) as the fictional language synthesized by the synthesizing unit 12Z becomes longer as the number of characters (a character length) of the different language text from which the voice as the fictional language is synthesized increases. For that reason, in a case where a voice as a fictional language is synthesized on the basis of a text after translation, the length of time of the voice depends upon the number of characters in the text after translation. Therefore, in a case where the voice as the fictional language is generated on the basis of the text after translation, this prevents timing of processes related to a voice output of the fictional language (for example, display of a different language text synchronized with output of a voice as a fictional language and lip movement of a character) from being deviated in timing.

Further, even when a text used in products such as video games and video works is translated for localization purposes, by using the same learned conversion model as that before translation, it is possible to generate a voice as a fictional language from a text after translation. For that reason, in order to generate a voice as a fictional language, a developer does not have to prepare dictionary data for each language in which character strings before conversion are respectively associated with character strings in the fictional language. Therefore, it becomes possible to generate a voice as a fictional language while suppressing an increase in the work burden on the developer.

Further, in the example of the fourth embodiment described above, the server 10Z is configured so that the converting unit 11Z uses the learned conversion model to convert the character that belongs to the predetermined language in the inputted text into the token (for example, an English character), converts the character that does not belong to the predetermined language in the inputted text into the numerical value (for example, a character code of an English character) in accordance with the predetermined rule, and converts the converted token and the converted numerical value into the voice feature amounts. Therefore, by additionally defining a process when a character not belonging to a predetermined language is inputted into a learned model used in Text to Speech (TTS) for the learned model, even though the character not belonging to the predetermined language is inputted into the learned model, a different language text is converted into a voice feature amount without causing an error and ignoring the character not belonging to the predetermined language. In this manner, it is possible to generate a voice as a fictional language. Thus, a developer no longer needs to carry out a work to prepare character strings of the fictional language. Therefore, there is no need to prepare character strings after conversion (that is, character strings of a fictional language) by an increase in the number of types of character strings that may be included in a text before conversion, and this makes it possible to suppress an increase in the work burden on the developer.

Further, in the example of the fourth embodiment described above, the server 10Z is configured so that the specifying unit 13Z refers to the storage unit that stores the reserved word information in which the reserved word is associated with the voice or the specifying method of the voice to specify the reserved word in the different language text, and changes the portion, which corresponds to the reserved word, of the voice synthesized from the voice feature amount into the voice associated with the reserved word. Thus, the user can understand the meaning of at least a part of the voice as the fictional language. For that reason, it becomes possible to prompt the user to guess the content of the voice as the fictional language. Further, in a case where products such as video games and video works are compliant to a plurality of languages (that is, localized), by using the reserved words, it is possible to speak only the reserved words in the voice in the fictional language by a real voice. Therefore, it becomes possible to globally unify the reserved words even though the user plays a video game in any language. For example, in a case where proper nouns are reserved words, by making the corresponding voices consistent in any language, it is possible to cause the user to recognize known proper nouns included in the fictional language.

Further, the server 10Z may be configured to: store a reserved word and a release condition so as to be associated with each other; determine whether a user satisfies the release condition or not; and further specify a reserved word included in a different language text among one or more reserved words each of which satisfies the release condition.

The release condition may include a condition associated with a reserved word, and may include a condition under which the reserved word is specified by the specifying unit 13Z. The release condition is not limited particularly. One example may be a condition for which it is determined whether to be satisfied for each of a plurality of reserved words. Examples of such a condition include a condition that flag information associated with each reserved word is ON, a condition that intelligibility (or a understanding level)

corresponding to a user (hereinafter, referred to as "user intelligibility") is higher than intelligibility associated with each reserved word (hereinafter, referred to as "required intelligibility"), and a condition that a user designates a reserved word. Examples of the user include a player of a video game, a viewer of a video work, and a producer of the video game or the video work. The user intelligibility is intelligibility of a fictional language, and is stored in a predetermined storage unit as numerical value information associated with the user. Examples of the user intelligibility include progress of the video game, viewing of the video work, and numerical value information updated based on the settings by the user. A configuration to update user intelligibility is not limited particularly. One example may be a configuration in which user intelligibility is increased or decreased as the video game is caused to proceed or viewing time of the video work is increased.

FIG. 12 is an explanatory drawing for explaining an example of a storage state of information according to at least one embodiment of the disclosure. FIG. 12 is an explanatory drawing for explaining an example of a storage state of information stored in a storage unit (not explicitly illustrated in the drawings) included in the server 10Z. As illustrated in FIG. 12, the storage unit stores a reserved word, a voice or a specifying method of the voice, and required intelligibility so as to be associated with each other as reserved word information.

By managing the reserved word, the voice or the specifying method of the voice, and the required intelligibility so as to be associated with each other, it is possible to specify a reserved word corresponding to intelligibility used when a fictional language voice is generated. The correspondence of each element is not limited to one-to-one, but may be many-to-one or one-to-many. One required intelligibility may be associated with a plurality of reserved words, or plural kinds of required intelligibility may be associated with one reserved word.

With the above configuration, for example, as the user causes the video game to proceed and thereby satisfy the release condition, it becomes possible to reduce the number of languages to be pronounced as the fictional language. Therefore, it becomes possible to provide the user with an experience in which the number of words that can be understood increases in accordance with progress of the video game.

Further, the server 10Z may be configured to store a reserved word and a change condition so as to be associated with each other, determine whether a user satisfies the change condition or not, and further change a portion, which corresponds to a reserved word that satisfies the change condition, of a voice synthesized from a voice feature amount into a voice that corresponds to the reserved word that satisfies the change condition.

The change condition may include a condition associated with a reserved word, and may include a condition under which a portion corresponding to a reserved word in a voice synthesized from a voice feature amount can be changed into a voice corresponding to the reserved word. The change condition is not limited particularly. One example may be a condition for which it is determined whether to be satisfied for each of a plurality of reserved words. Examples of such a condition include a condition that flag information associated with each reserved word is ON, a condition that user intelligibility is higher than required intelligibility, and a condition that a user designates a reserved word.

With the above configuration, for example, as the user causes the video game to proceed and thereby increase his or her intelligibility, it becomes possible to reduce the number of languages to be pronounced as the fictional language. Therefore, it becomes possible to provide the user with an experience in which the number of words that can be understood increases in accordance with progress of the video game.

Further, the server 10Z may be configured to designate, in a case where a learned conversion model has been learned in advance to convert a text of each of a plurality of languages into a voice feature amount, any of the plurality of languages to the learned conversion model as a language (a predetermined language) corresponding to the learned conversion model, and set the learned conversion model to a state where it has not been learned in advance to convert a text of a language (a different language) different from the language designated as the predetermined language into a voice feature amount. By configuring the converting unit 11Z in this manner, in a case where a learned conversion model compliant to a plurality of languages is used, it becomes possible to generate a voice as a fictional language by inputting a text in any language of the plurality of languages into the learned conversion model.

Further, in a case where both a predetermined language and a different language uses alphabets, the number of alphabetic characters belonging to the predetermined language may be smaller than the number of alphabetic characters belonging to the different language. For example, English has 26 alphabetic characters, French has 39 alphabetic characters, German has 30 alphabetic characters, Swahili has 29 alphabetic characters, and Italian has 21 alphabetic characters. Since these languages respectively uses the alphabetic characters, it is thought that French has alphabetic characters that do not exist in English, and that English has alphabetic characters that do not exist in Italian. In a case where a fictional language is generated from an English text by using a learned conversion model corresponding to Italian, alphabetic characters that do not exist in Italian of the alphabetic characters in the English text are respectively converted into numerical values in accordance with a predetermined rule. On the other hand, in a case where a fictional language is generated from an English text by using a learned conversion model corresponding to French, conversion into a numerical value is not executed in accordance with a predetermined rule. For that reason, in case of trying to generate a fictional language from an English text by using the learned conversion model corresponding to French, it is thought that the generated voice as the fictional language is similar to the voice as English as compared with a case the learned conversion model corresponding to Italian (It sounds like a non-native speaker is trying to speak English (sounds like an accent)). This is thought to be because a difference between the input text and the generated voice tends to become larger when conversion into numerical values is executed. Therefore, by setting to become a relationship that the number of alphabetic characters belonging to the language corresponding to the learned conversion model (the predetermined language) is smaller than the number of alphabetic characters belonging to the language belonging to the inputted text (the different language), it becomes possible to cause the user to feel the generated voice as the fictional language more strongly. This can be said to make it easier to sound like a fictional language if there is no corresponding alphabet. While the case where the inputted languages are the same and the languages corresponding to the learned conversion model are different has been described as an example, a similar thing can also be said in a case where the inputted languages are different and the languages corresponding to the learned conversion model are the same.

Fifth Embodiment

In each of the embodiments described above, in order to increase the variations of fictional languages, additional processes may be provided. Hereinafter, as the additional processes, three processes (including text processing, voice processing, and condition processing) will be described as processes (or tricks) that can be added to a TTS model. In this regard, the additional processes may be realized by a non-learning method, or may be realized by a learning-based method.

The text processing may include a process that can be added before entering an input sentence into a TTS system. By configuring so as to convert a text before entering into the TTS in accordance with a predetermined rule, an output (that is, the content to be read) changes. Therefore, it becomes possible to give the impression of a more fictional language to a listener. Examples of a rule for converting a text include a rule for converting a text entered in kana into Roman characters and replacing at least a part of the Roman characters, a rule for reversing the word order of Roman characters after conversion, and a rule for processing Roman characters after conversion using Caesar cipher.

The voice processing may include a process that can be added before voice data outputted from the TTS are outputted. By configuring so as to convert the voice data outputted from the TTS in accordance with a predetermined rule, it becomes possible to realize a voice output according to the purpose, such as reinforcing the impression that a language is spoken by a species other than humans (for example, so-called monsters). Examples of a rule for converting voice data include a rule for converting voice characteristics (for example, frequency or a pitch).

The condition processing may include a process added to the TTS. By configuring so as to set a condition to the TTS, it becomes possible to provide diversity in voices to be outputted. Examples of the condition set to the TTS include a configuration to use speaker information or speaker vectors (x-vectors) obtained through deep learning. By providing various conditions, it becomes possible to realize the expression of "(Characters who use a fictional language have a (fundamentally) different culture and (fundamentally) different emotional behavior from those of us)", such as "(As a natural language, at timing when the feeling of joy would come) I do not understand, but you are angry" and "(As a natural language, at timing when the feeling of sadness would come) You look kind of happy". Moreover, in addition to the speaker information and usage of x-vectors as the condition of the TTS, it may be configured so that after adding any processing to the condition, the processed condition is applied to the TTS. By configuring a system according to the present embodiment in this manner, it is possible to more strongly give, to the listener, the impression that the configuration that the listener becomes "strange" when to apply the additional processes to general TTS is based on the fictional language.

In certain embodiments of the disclosure, a configuration in which a plurality of additional processes is used in combination may be adopted. Further, a configuration in which a plurality of voices is generated from a certain text by different additional processes (for example, speaker information as the condition processing) may also be adopted.

As described herein, one problem or two or more problems can be solved by each of the embodiments of the disclosure. The effects by each of the embodiments are non-limiting effects or examples of the non-limiting effects.

According to each of the embodiments described herein, each of the plurality of user terminals 20, and 201 to 20N and the server 10 executes the various kinds of processing described above in accordance with various kinds of control programs (for example, a voice generating program) stored in the storage device with which the corresponding terminal or server is provided.

The configuration of the system 100 is not limited to the configuration that has been explained as an example of each of the embodiments described herein. For example, the system 100 may be configured so that the server 10 executes a part or all of the processes that have been explained as the processes executed by the user terminal 20. Alternatively, the system 100 may be configured so that any of the plurality of user terminals 20, and 201 to 20N (for example, the user terminal 20) executes a part or all of the processes that have been explained as the processes executed by the server 10. Further, the system 100 may be configured so that a part or all of the storage unit included in the server 10 is included in any of the plurality of user terminals 20, and 201 to 20N. The system 100 may be configured so that a part or all of the functions of any one of the user terminal 20 and the server 10 according to the system 100 is included in the other.

The system 100 may be configured so that the program causes a single apparatus to perform a part or all of the functions that have been explained as the example of each of the embodiments described herein without including a communication network.

APPENDIX

Certain embodiments of the disclosure have been described so that at least the following can be carried out by a person having ordinary skill in the art.

(1)

A non-transitory computer-readable medium including a voice generating program that, when executed, causes a server to perform functions to generate a voice from a text, the functions comprising:

a converting function configured to convert a first text into a voice feature amount by inputting the first text into a learned conversion model, wherein the first text is in a different language from a predetermined language, and the learned conversion model is pre-learned to convert a second text in the predetermined language into a voice feature amount; and a synthesizing function configured to synthesize a voice from the converted voice feature amount.

(2)

The non-transitory computer-readable medium according to (1), wherein the converting function is configured to convert a character that belongs to the predetermined language in the inputted first text into a token by using the learned conversion model, and convert a character that does not belong to the predetermined language in the inputted first text into a numerical value in accordance with a predetermined rule, the converting function being further configured to convert the token and the numerical value into the voice feature amount.

(3)

The non-transitory computer-readable medium according to (1) or (2), the functions further comprising:
 a specifying function configured to refer to a storage unit configured to store reserved word information in which a reserved word registered in a predetermined storage region is associated with a voice or a specifying method of the voice, and specify the reserved word in the first text,
 wherein the synthesizing function is configured to change a portion, which corresponds to the specified reserved word, of the synthesized voice into a voice that corresponds to the specified reserved word.

(3-1)

The non-transitory computer-readable medium according to (3).
 wherein the storage unit is configured to store the reserved word and a release condition so as to be associated with each other,
 wherein the functions further comprise:
 a release determining function configured to determine whether a user satisfies the release condition or not, and
 wherein the specifying function is configured to specify the reserved word included in the first text among one or more reserved words each of which satisfies the release condition.

(3-2)

The non-transitory computer-readable medium according to (3) or (3-1),
 wherein the storage unit is configured to store the reserved word and a change condition so as to be associated with each other,
 wherein the functions further comprise:
 a change determining function configured to determine whether a user satisfies the change condition or not, and
 wherein the synthesizing function is configured to change a portion, which corresponds to a reserved word that satisfies the change condition, of the synthesized voice into a voice that corresponds to the reserved word that satisfies the change condition.

(4)

A non-transitory computer-readable medium including a voice generating program that, when executed, causes a user terminal to perform at least one function of the functions that the voice generating program described in any one of (1) to (3) causes the server to perform, the user terminal being capable of communicating with the server.

(5)

A voice generating system for executing processes to generate a voice from a text, the voice generating system comprising a communication network, a server, and a user terminal, the voice generating system further comprising:
 a converter configured to convert a first text into a voice feature amount by inputting the first text into a learned conversion model, wherein the first text is in a different language from a predetermined language, and the learned conversion model is pre-learned to convert a second text in the predetermined language into a voice feature amount; and
 a synthesizer configured to synthesize a voice from the converted voice feature amount.

(6)

The voice generating system according to (5),
 wherein the server includes the converter and the synthesizer, and
 wherein the user terminal includes an output controller configured to cause an output device to output the voice synthesized by the synthesizer.

(7)

A non-transitory computer-readable medium including a voice generating program that, when executed, causes a user terminal to perform functions to generate a voice from a text, the functions comprising:
 a converting function configured to convert a first text into a voice feature amount by inputting the first text into a learned conversion model, wherein the first text is in a different language from a predetermined language, and the learned conversion model is pre-learned to convert a second text in the predetermined language into a voice feature amount; and
 a synthesizing function configured to synthesize a voice from the converted voice feature amount.

(8)

A voice generating method of generating a voice from a text, the voice generating method comprising:
 a converting process configured to convert a first text into a voice feature amount by inputting the first text into a learned conversion model, wherein the first text is in a different language from a predetermined language, and the learned conversion model is pre-learned to convert a second text in the predetermined language into a voice feature amount; and
 a synthesizing process configured to synthesize a voice from the converted voice feature amount.

(9)

A voice generating method of generating a voice from a text by a voice generating system, the voice generating system comprising a communication network, a server, and the user terminal, the voice generating method comprising:
 a converting process configured to convert a first text into a voice feature amount by inputting the first text into a learned conversion model, wherein the first text is in a different language from a predetermined language, and the learned conversion model is pre-learned to convert a second text in the predetermined language into a voice feature amount; and
 a synthesizing process configured to synthesize a voice from the converted voice feature amount.

According to one or more of the embodiments of the disclosure described herein, it is useful to generate a voice as a fictional language while suppressing an increase in the work burden on a developer.

What is claimed is:
1. A non-transitory computer-readable medium including a program that, when executed, causes a server to perform functions comprising:
 converting a first text into a voice feature amount by inputting the first text into a learned conversion model, wherein the first text is in a different language from a predetermined language, and the learned conversion model is pre-learned to convert a second text in the predetermined language into a voice feature amount;
 synthesizing a voice from the converted voice feature amount;
 referring to a storage unit configured to store reserved word information in which a reserved word registered in a predetermined storage region is associated with a voice or a specifying method of the voice; and specifying the reserved word in the first text, wherein
synthesizing the voice includes changing a portion, which corresponds to the specified reserved word, of the synthesized voice into a voice that corresponds to the specified reserved word,
the storage unit is configured to store the reserved word and a release condition associated with each other, and
the functions further comprise:
  determining whether a user satisfies the release condition; and
  specifying the reserved word includes specifying the reserved word included in the first text among one or more reserved words each of which satisfies the release condition.

2. The non-transitory computer-readable medium according to claim 1, wherein converting the first text includes:
  converting a character that belongs to the predetermined language in the inputted first text into a token by using the learned conversion model;
  converting a character that does not belong to the predetermined language in the inputted first text into a numerical value in accordance with a predetermined rule; and
  converting the token and the numerical value into the voice feature amount.

3. The non-transitory computer-readable medium according to claim 1, wherein
  the storage unit is configured to store the reserved word and a change condition associated with each other,
  the functions further comprise determining whether a user satisfies the change condition, and
  synthesizing the voice includes changing a portion, which corresponds to the reserved word that satisfies the change condition, of the synthesized voice into a voice that corresponds to the reserved word that satisfies the change condition.

4. A voice generating system configured to execute processes to generate a voice from a text, the system comprising a communication network, a server, and a user terminal, the system further comprising one or more processors configured to:
  convert a first text into a voice feature amount by inputting the first text into a learned conversion model, wherein the first text is in a different language from a predetermined language, and the learned conversion model is pre-learned to convert a second text in the predetermined language into a voice feature amount; and
  synthesize a voice from the converted voice feature amount;
  refer to a storage unit configured to store reserved word information in which a reserved word registered in a predetermined storage region is associated with a voice or a specifying method of the voice; and
  specify the reserved word in the first text, wherein
  synthesize the voice includes changing a portion, which corresponds to the specified reserved word, of the synthesized voice into a voice that corresponds to the specified reserved word,
  the storage unit is configured to store the reserved word and a release condition associated with each other, and
  the one or more processors is further configured to:
    determine whether a user satisfies the release condition; and
    specify the reserved word includes specifying the reserved word included in the first text among one or more reserved words each of which satisfies the release condition.

5. A non-transitory computer-readable medium including a program that, when executed, causes a user terminal to perform functions comprising:
  converting a first text into a voice feature amount by inputting the first text into a learned conversion model, wherein the first text is in a different language from a predetermined language, and the learned conversion model is pre-learned to convert a second text in the predetermined language into a voice feature amount;
  synthesizing a voice from the converted voice feature amount;
  referring to a storage unit configured to store reserved word information in which a reserved word registered in a predetermined storage region is associated with a voice or a specifying method of the voice; and
  specifying the reserved word in the first text, wherein
  synthesizing the voice includes changing a portion, which corresponds to the specified reserved word, of the synthesized voice into a voice that corresponds to the specified reserved word,
  the storage unit is configured to store the reserved word and a release condition associated with each other, and
  the functions further comprise:
    determining whether a user satisfies the release condition; and
    specifying the reserved word includes specifying the reserved word included in the first text among one or more reserved words each of which satisfies the release condition.

* * * * *